UNITED STATES PATENT OFFICE.

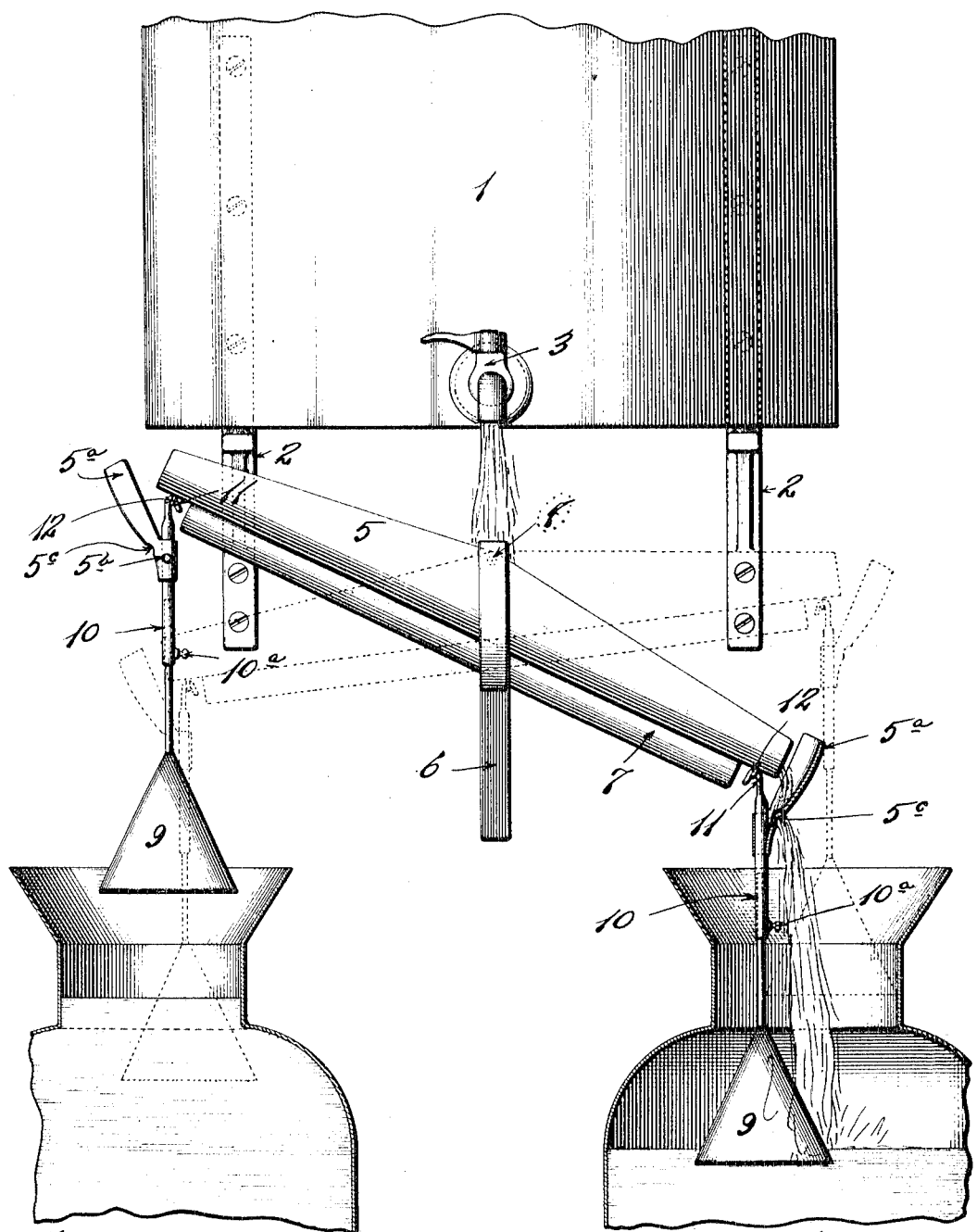

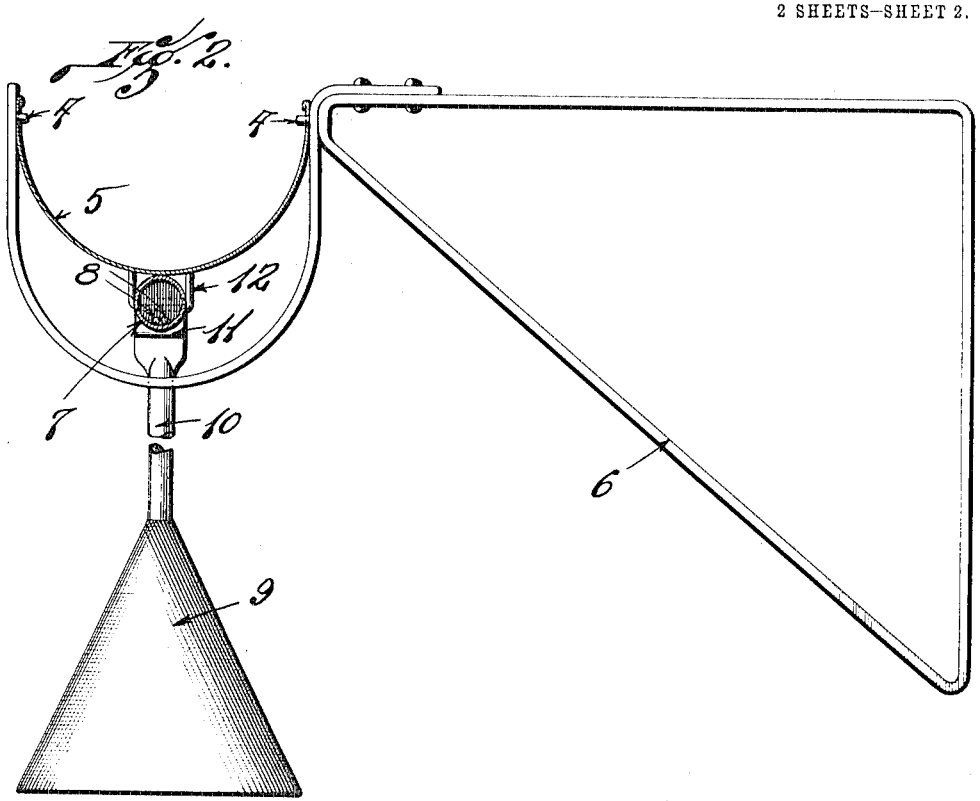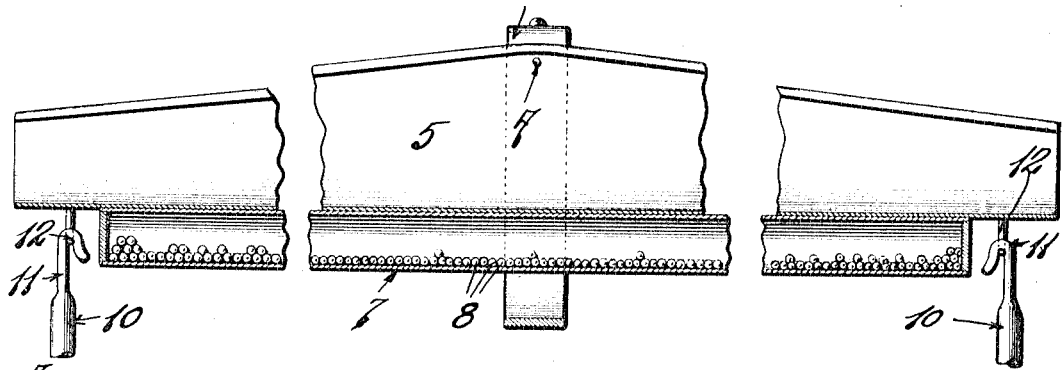

CHARLES ARTHUR PATTON, OF VILLA RIDGE, MISSOURI.

MILK-CAN FILLER.

1,081,982.  Specification of Letters Patent.  Patented Dec. 23, 1913.

Application filed August 17, 1912. Serial No. 715,687.

*To all whom it may concern:*

Be it known that I, CHARLES A. PATTON, a citizen of the United States, and resident of Villa Ridge, Franklin county, Missouri, have invented certain new and useful Improvements in Milk-Can Fillers, of which the following is a specification containing a full, clear, and exact description, reference being had to the accompanying drawings, forming a part hereof.

My invention relates to an improved milk can filler, and consists in the novel construction hereinafter described and expressly designated in the appended claims.

The object of my invention is to provide an improved milk can filler which will operate automatically to direct a stream of milk flowing from a reservoir can into first one milk can and then another, whereby the time of the attendant will be greatly economized, relieving him from the necessity of standing and watching the cans to be filled, in order to prevent their overflow and consequent waste of milk.

In the drawings: Figure 1 is a sectional front elevation of my improved milk can filler in operation; Fig. 2 is a sectional side elevation of the automatic filling spout and its supporting bracket, and Fig. 3 is a sectional front view of the parts last mentioned, portions being broken away to economize in drafting space.

The numeral 1 indicates a reservoir can, supported, as usual, upon brackets 2 provided with a common faucet 3 for controlling the flow of milk from said reservoir can. Pivotally mounted centrally of its length by means of pivots 4 at a point beneath said faucet 3 is a rockable automatic filling spout 5, which is preferably U-shaped in cross section. At each end of said filling spout is mounted a guard or funnel 5$^a$ to direct the stream of milk downwardly into the can. The said guard 5$^a$ is preferably adjustably mounted upon the upper section of the float stem 10, and by loosening the set screw 5$^b$ the said guard may be adjusted upwardly and downwardly upon said stem, as required. The said guard 5$^a$ is also provided with an opening 5$^c$ in its lower portion to permit exit of the milk. Said pivots 4 project opposite each other from the front portion of a supporting bracket 6, which is of course to be secured to the wall or to some other suitable support at a point beneath said reservoir can 1. Soldered, or likewise secured to the under surface of the said rockable filling spout 5 and extending parallel with the same is a container 7 for any suitable movable weight, such as common shot 8. Of course this movable weight 8 may be in the form of shot, sand, gravel, or any suitable granular material, or even a liquid.

Suspended from each end of the rockable filling spout 5 is a float 9, which is preferably conical in form, although any other form of float may be used. The floats 9 are each provided with a stem 10, at the upper end of which is formed a hook 11 for pivotally engaging the loop 12 secured to the under surface of the said spout, so that the float stems will always hang perpendicularly during the oscillation of the said rockable spout. The said float stems 10 are preferably made in two telescopic sections, so that they may be adjusted in length for filling milk cans of various heights. I have shown the lower sections of the stems 10 adjustably mounted within the upper sections and held therein by set screws 10$^a$, so that the sections of each stem may be relatively adjusted in length.

The operation is as follows: The milk cans to be filled are placed in a row in a plane below the rockable filling spout 5, and a float 9 is adjusted to enter the neck of the can beneath it. The relative positions of the parts at the beginning of the filling operation are those in which they are shown in Fig. 1, at which time the right hand end of the filling spout 5 is depressed, and the float 9 is located within the neck of the milk can at the right hand side of the drawing. The body of shot 8, forming the movable weight within the filling spout container 7, when the said spout is in the position shown, will have gravitated to the right hand end of said container and will therefore hold the container and the filling spout in the positions in which they are shown. The attendant now opens the faucet to permit a stream of milk to flow into the filling spout 5, from whence it will be directed into the milk can at the right hand of the drawing and will continue to run thereinto until the can is sufficiently filled, whereupon the float 9 will be raised by the rising milk within said can, and will correspondingly elevate the right hand end of the rockable spout 5 and the container 7, until the movable weight 8 gravitates toward the opposite end of the said container. The said movable weight will thus change the center of gravity of said rockable spout and it will assume the position in which it is shown in dotted lines in Fig. 1, and the stream of milk will be automatically cut off from the milk can at the right hand of the figure and directed into another milk can at the right hand of the figure, until the last mentioned can is filled, whereupon the parts will again assume the positions in which they are shown by full lines. After a can has been thus filled with milk, the attendant removes the filled can and places another empty can in position to be filled in like manner.

I claim:

1. The improved milk can filler, comprising a rockable filling spout pivotally mounted, floats adapted to rock said spout during the operation of filling milk cans, float stems telescopically adjustable in length and connecting said floats to said rockable filling spout, a guard at the end of said spout, means for securing said guard to one of said float-stems, a cylindrical weight-container connected to the under side of said rockable spout and extending longitudinally thereof to a point adjacent the ends of said spout, and a suitable movable weight within said weight-container.

2. The improved can filler, comprising a movable spout adapted to receive a stream of liquid from a source of supply, a float connected to said spout and adapted to control the movements thereof, a guard at the end of said spout to direct the liquid into the can to be filled, a stem for said float, and means arranged to adjustably secure said guard upon said stem.

In testimony whereof, I have signed my name to this specification, in presence of two subscribing witnesses.

CHARLES ARTHUR PATTON.

Witnesses:
FERGUS H. DISHAROON,
JUDD W. ORAM.